United States Patent
Das et al.

(10) Patent No.: US 9,521,111 B2
(45) Date of Patent: *Dec. 13, 2016

(54) METHODS, SYSTEMS, AND PRODUCTS FOR ADDRESS TRANSLATION

(71) Applicant: AT&T Intellectual Property I, L.P., Atlanta, GA (US)

(72) Inventors: Jayanta Das, Morganville, NJ (US); Bhavin A. Doshi, Morganville, NJ (US); Anand Kumar Singh, Lewisville, TX (US); Saurabh Kumar, Jersey City, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,465

(22) Filed: Aug. 15, 2014

(65) Prior Publication Data

US 2014/0359164 A1   Dec. 4, 2014

Related U.S. Application Data

(63) Continuation of application No. 13/170,674, filed on Jun. 28, 2011, now Pat. No. 8,838,735.

(51) Int. Cl.
| | |
|---|---|
| *G06F 15/16* | (2006.01) |
| *H04L 12/28* | (2006.01) |
| *H04L 12/56* | (2006.01) |
| *H04L 29/12* | (2006.01) |
| *H04L 12/66* | (2006.01) |

(52) U.S. Cl.
CPC ........... *H04L 61/25* (2013.01); *H04L 61/2514* (2013.01); *H04L 61/2567* (2013.01); *H04L 61/2585* (2013.01); *H04L 12/2834* (2013.01); *H04L 12/66* (2013.01); *H04L 61/256* (2013.01)

(58) Field of Classification Search
CPC ............ H04L 61/25–61/2596; H04L 12/2834; H04L 12/66
See application file for complete search history.

(56) References Cited

U.S. PATENT DOCUMENTS

| | | | |
|---|---|---|---|
| 6,789,115 B1 | 9/2004 | Singer et al. | |
| 7,058,973 B1 | 6/2006 | Sultan | |
| 7,099,944 B1 | 8/2006 | Anschutz et al. | |
| 7,954,131 B2 | 5/2011 | Cholas et al. | |
| 2003/0118002 A1* | 6/2003 | Bradd ............... | H04L 29/12009 370/352 |
| 2004/0141484 A1 | 7/2004 | Rogalski et al. | |
| 2004/0218611 A1 | 11/2004 | Kim | |
| 2005/0063357 A1 | 3/2005 | Wewalaarachchi et al. | |
| 2006/0039367 A1 | 2/2006 | Wright et al. | |
| 2006/0126613 A1 | 6/2006 | Zweig | |
| 2006/0210084 A1 | 9/2006 | Fransdonk | |
| 2007/0078993 A1 | 4/2007 | Issa | |
| 2007/0093199 A1 | 4/2007 | Bowen et al. | |

(Continued)

*Primary Examiner* — Wing F Chan
*Assistant Examiner* — Raji Krishnan
(74) *Attorney, Agent, or Firm* — Scott P. Zimmerman, PLLC

(57) ABSTRACT

Methods, systems, and products translate addresses in residential networks. A residential gateway translates requests for content such that the residential gateway appears as both a requestor and a destination for requested content, regardless of an actual requesting device or a desired output device.

16 Claims, 15 Drawing Sheets

(56) References Cited

U.S. PATENT DOCUMENTS

| | | |
|---|---|---|
| 2007/0217436 A1 | 9/2007 | Markley et al. |
| 2007/0297454 A1 | 12/2007 | Brothers |
| 2008/0117922 A1* | 5/2008 | Cockrell ................. H04L 12/66 370/401 |
| 2008/0133811 A1 | 6/2008 | Lu et al. |
| 2008/0254742 A1* | 10/2008 | Trappeniers ........... G06Q 30/06 455/3.06 |
| 2008/0310435 A1 | 12/2008 | Cagenius et al. |
| 2008/0320116 A1 | 12/2008 | Briggs |
| 2009/0028167 A1 | 1/2009 | Takeda et al. |
| 2009/0180476 A1 | 7/2009 | Lee et al. |
| 2009/0296567 A1 | 12/2009 | Yasrebi et al. |
| 2010/0023994 A1 | 1/2010 | Taylor et al. |
| 2010/0070636 A1 | 3/2010 | Skog et al. |
| 2010/0114896 A1 | 5/2010 | Clark et al. |
| 2010/0135279 A1 | 6/2010 | Petersson et al. |
| 2010/0220714 A1 | 9/2010 | Clark et al. |
| 2011/0044347 A1 | 2/2011 | Taylor et al. |
| 2011/0058553 A1* | 3/2011 | Brzozowski ...... H04L 29/12358 370/392 |
| 2011/0138413 A1 | 6/2011 | Hjelm et al. |
| 2011/0320619 A1 | 12/2011 | Kolbe et al. |
| 2012/0151525 A1* | 6/2012 | Demchenko ......... H04N 21/482 725/39 |
| 2012/0173746 A1* | 7/2012 | Salinger .............. H04L 41/5019 709/230 |
| 2012/0243469 A1 | 9/2012 | Klein |
| 2014/0114768 A1 | 4/2014 | Filipov |
| 2014/0143674 A1* | 5/2014 | Kruglick ............... G06F 3/0484 715/738 |

* cited by examiner

METHODS, SYSTEMS, AND PRODUCTS FOR ADDRESS TRANSLATION

CROSS-REFERENCE TO RELATED APPLICATION

This application is a continuation of U.S. patent application Ser. No. 13/170,674 filed Jun. 28, 2011 and now issued as U.S. Pat. No. 8,838,735 and incorporated herein by reference in its entirety.

BACKGROUND

Exemplary embodiments generally relate to computers and networks and, more particularly, to content management in residential networks.

Homes today have many devices that receive content. A home network commonly has a desktop computer, a laptop computer, and even one or more tablet computers (such as an APPLE® IPAD®). Multiple smart phones (such as Apple's IPHONE®) may also connect to the home network. Yet the home network may also include a digital recorder, home theater, and even networked appliances (such as a networked refrigerator). The complexity of typical home networks has made content management cumbersome for most users.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
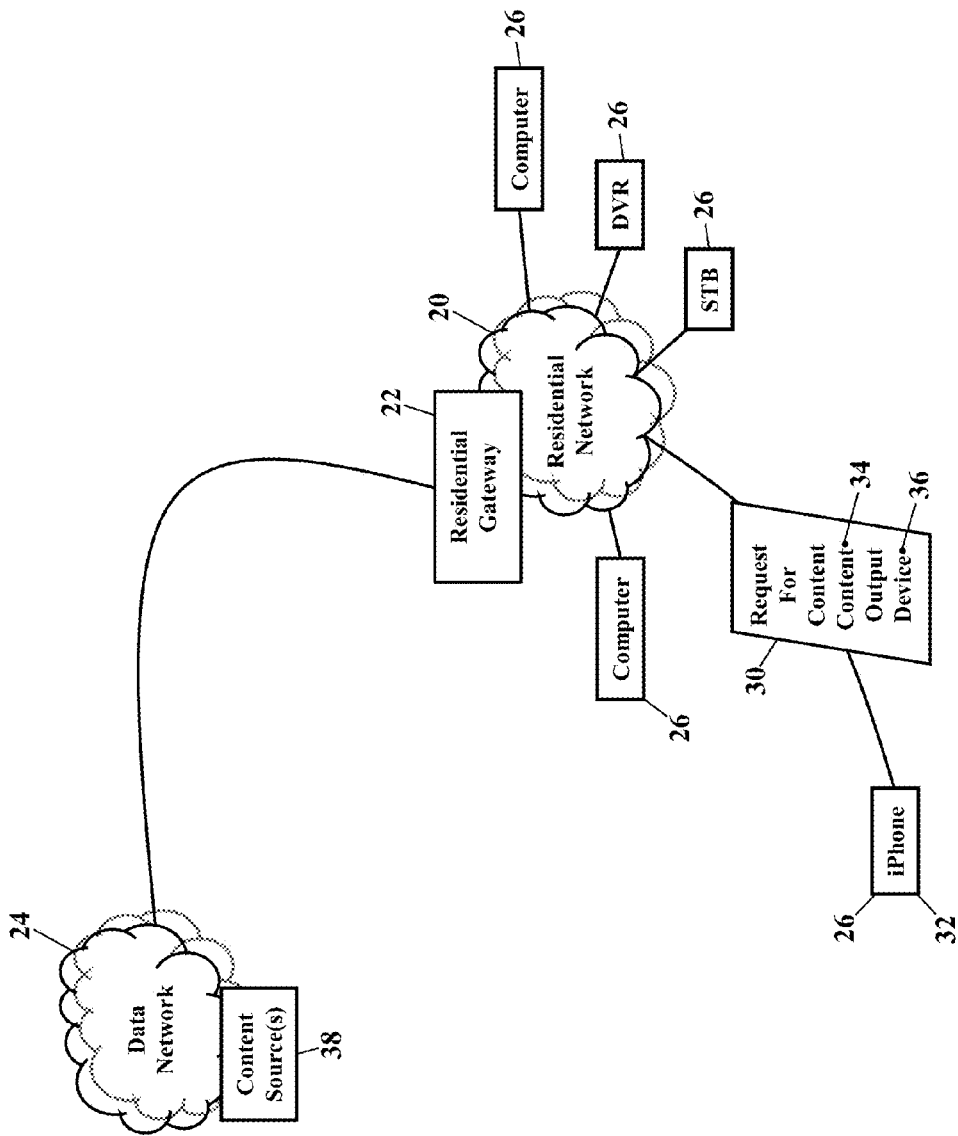
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server architecture for a residential network 20. A residential gateway 22 communicates with the residential network 20 and with a data network 24. The residential gateway 22 also communicates with one or more networked devices 26 operating in the residential network 20. Today's home networks have many networked devices 26, such as desktop computers, laptop computers, cameras, digital recorders, a home theater, smart phones (e.g., an IPHONE®), and tablet computers (such as an IPAD®). Common appliances, like refrigerators, may also have network capability. The residential gateway 22 may thus interface with many networked devices 26 connected to, or communicating with, the residential network 20.

The residential gateway 22 manages media content. When a user wants to download content, the residential gateway 22 receives a request 30 for content from a requesting device 32 in the residential network 20. The request 30 for content describes some movie, music, or other content 34 a user would like to experience. Here, though, the request 30 for content may also specify an output device 36 to which the content 34 is destined. That is, even though the request 30 for content originates from the requesting device 32, the user may specify the different output device 36 to which the content 34 is eventually delivered. The residential gateway 22 thus brokers transactions between the requesting device 32, a content source 38, and the output device 36, such that the content 34 may be managed independent of devices (as later paragraphs will explain).

The residential gateway 22 thus recognizes preferred requesting devices. Today the user commonly has many networked devices 26, such as a desktop computer, a laptop computer, a digital recorder, a home theater, a smart phone (e.g., IPHONE®), and a tablet computer (such as an IPAD®). Common appliances, like refrigerators, may also have network capability. Even though the user may have many networked devices 26, the user may prefer to use a single device, or only a few devices, when surfing content. The user, for example, may prefer to surf the web using the IPHONE® or IPAD®. The user ordinarily does not surf from the digital recorder or the refrigerator. Exemplary embodiments thus allow the user to make requests from a preferred input device (such as the user's IPHONE® or IPAD®) and, yet, have the content 34 delivered to the different output device 36. The residential gateway 22 thus allows the user to request movies, music, and other content without regard for the capabilities of the requesting device 32.

The residential gateway 22 may also receive the content 34 independent of the output device 36. Because the user may have many networked devices 26 in their residential network 20, not all of the networked devices 26 have the same capabilities. Some networked devices 26 may be unable to render certain video formats. Some networked devices 26 may be unable to render certain web content, and some networked devices 26 may be unable to play certain file formats. Regardless, the residential gateway 22 allows the user to request the content 34 without regard or concern for the capabilities of the networked devices 26. The user may select any of the networked devices 26 as the output device 36. The residential gateway 22 brokers transactions such that the output device 36 is transparent to the content source 38 (as later paragraphs will explain). The residential gateway 22 may even format the content 34 to suit the capabilities of the output device 36 (again, as later paragraphs will explain).

Exemplary embodiments thus improve content sharing and distribution in the residential network 20. Web-based gaming, IPTV programming, and other content may be requested, shared, and distributed without concern for the requesting device 32 or for the output device 36. The residential gateway 22 provides a simple and convenient mechanism for ordering the content 34, and the user's content experience is enhanced for in-home media viewing. No increase in access bandwidth is needed in order to support concurrent viewing. The user may use their preferred requesting device 32 for convenient and faster access to the content 34.

Figure 2:
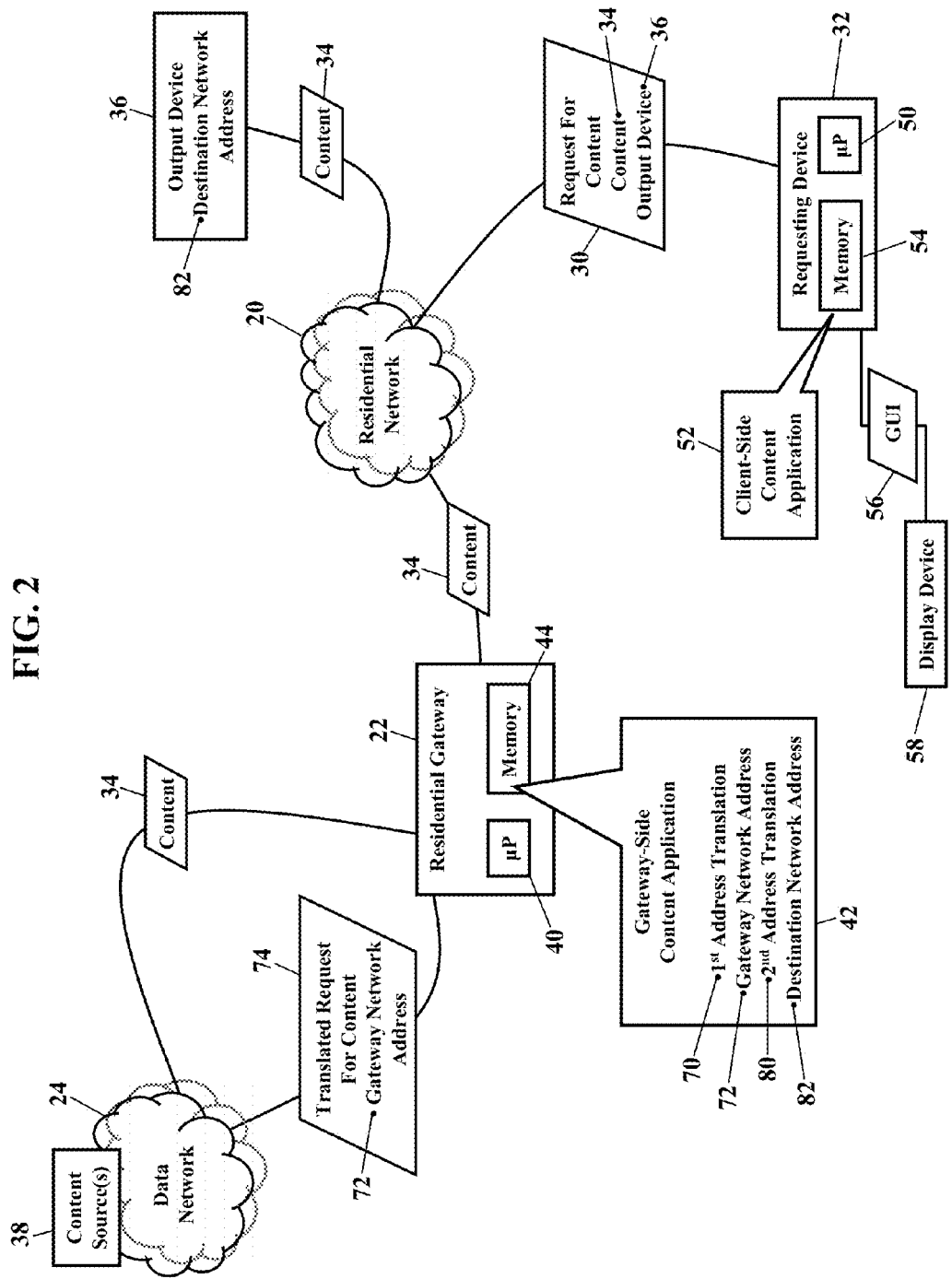
FIG. 2 is a more detailed schematic illustrating the operating environment, according to exemplary embodiments.

FIG. 2 is a more detailed schematic illustrating the operating environment, according to exemplary embodiments. The residential gateway 22 has a processor 40 (e.g., "µP"), application specific integrated circuit (ASIC), or other component that executes a gateway-side content application 42 stored in a memory 44. The gateway-side content application 42 includes an algorithm that identifies the residential gateway 22 as both a requestor and as a destination of the requested content 34. The gateway-side content application 42, however, may operate in any processor-controlled device, as later paragraphs will explain.

The residential gateway 22 communicates with the requesting device 32 in the residential network 20. The requesting device 32 also has a processor 50 (e.g., "µP"), application specific integrated circuit (ASIC), or other component that executes a client-side content application 52 stored in a memory 54. The client-side content application 52 may cooperate with the gateway-side content application 42 to request and deliver the content 34 to the desired output device 36. The client-side content application 52 includes an algorithm that allows the user to graphically select the output device 36 as the destination for the content 34. The client-side content application 52 may cause the processor 50 to produce a graphical user interface ("GUI") 56. The graphical user interface 56 is illustrated as being visually produced on a display device 58, yet the graphical user interface 56 may also have audible features. The client-side content application 52, however, may operate in any processor-controlled device, as later paragraphs will explain.

The residential gateway 22 manages content requests. When the user wishes to request some movie, music, or other content, the user causes the requesting device 32 to send the request 30 for content. The user simply invokes various selection mechanisms from the graphical user interface 56 (as later paragraphs explain). The request 30 for content identifies the content 34 that is desired. The user, though, may also specify which of the networked devices (illustrated as reference numeral 26 in FIG. 1) shall receive the content 34. The user, in other words, specifies the output device 36 for the content 34 described in the request 30 for content. The request 30 for content thus originates from the requesting device 32, but the user may specify the different output device 36 to which the content 34 is eventually delivered. The request 30 for content is sent along the residential network 20 to the residential gateway 22.

The residential gateway 22 performs a first address translation 70. When the residential gateway 22 receives the request 30 for content, the gateway-side content application 42 substitutes its gateway network address 72 for the output device 36. That is, the gateway-side content application 42 reformats the request 30 for content, such that the request 30 for content appears to originate from the residential gateway 22 itself. Even though the request 30 for content originated from the requesting device 32, the gateway-side content application 42 reformats the request 30 for content to identify its gateway network address 72 as an originator. Similarly, the gateway-side content application 42 may also reformat the request 30 for content to identify its gateway network address 72 as a destination for the requested content. The request 30 for content is thus translated to identify residential gateway 22 as the requestor and/or as the destination of the requested content 34. This mechanism thus translates content requests to originate from the residential gateway 22. Content requests are also translated to destine to the residential gateway 22.

The residential gateway 22 thus issues a translated request 74 for content. The translated request 74 for content identifies the residential gateway 22 as the requestor and as the destination of the content 34. The gateway-side content application 42 causes the processor 40 to send the translated request 74 for content into the data network 24. The translated request 74 for content routes to some network address associated with the content source 38. The content source 38 retrieves the requested content 34 and sends the content 34 back to the residential gateway 22, as identified in the translated request 74 for content.

The residential gateway 22 then performs a second address translation 80. When the residential gateway 22 receives the content 34, the gateway-side content application 42 then routes the content 34 to the desired output device 36, as originally specified in the request 30 for content. The gateway-side content application 42 causes the processor 40 to perform the second address translation 80 by substituting a destination network address 82 to the output device 36. The gateway-side content application 42 reformats packets of data in the requested content 34 to now identify the desired output device 36 as the final destination. The second address translation 80 may thus be one or more custom-defined translation algorithms based on the user's preference for the desired output device 36. The second address translation 80 may thus override the first address translation 70. The residential gateway 22 thus routes the content 34 to the desired output device 36, as originally specified in the request 30 for content.

The residential gateway 22 thus manages the user's media content. The residential gateway 22 deliberately inserts itself to purposefully manage media content. The residential gateway 22 brokers any transactions to be independent of devices. The user may thus request movies, music, and other content without regard for the capabilities of the requesting device 32. Indeed, exemplary embodiments empower user-friendly, simple devices to request complicated, processor-intensive data. Easy-to-use preferred input devices may be used to designate more capable output devices. Exemplary embodiments even allow the content 34 to be shared and distributed without concern for the requesting device 32 or for the output device 36. Even the bandwidth capabilities of an Internet connection to the requesting device 32 are unimportant, as limited bandwidth is only needed to send the request 30 for content to the residential gateway 22. Mobile devices are thus empowered to request bandwidth-intensive data.

Figure 3:
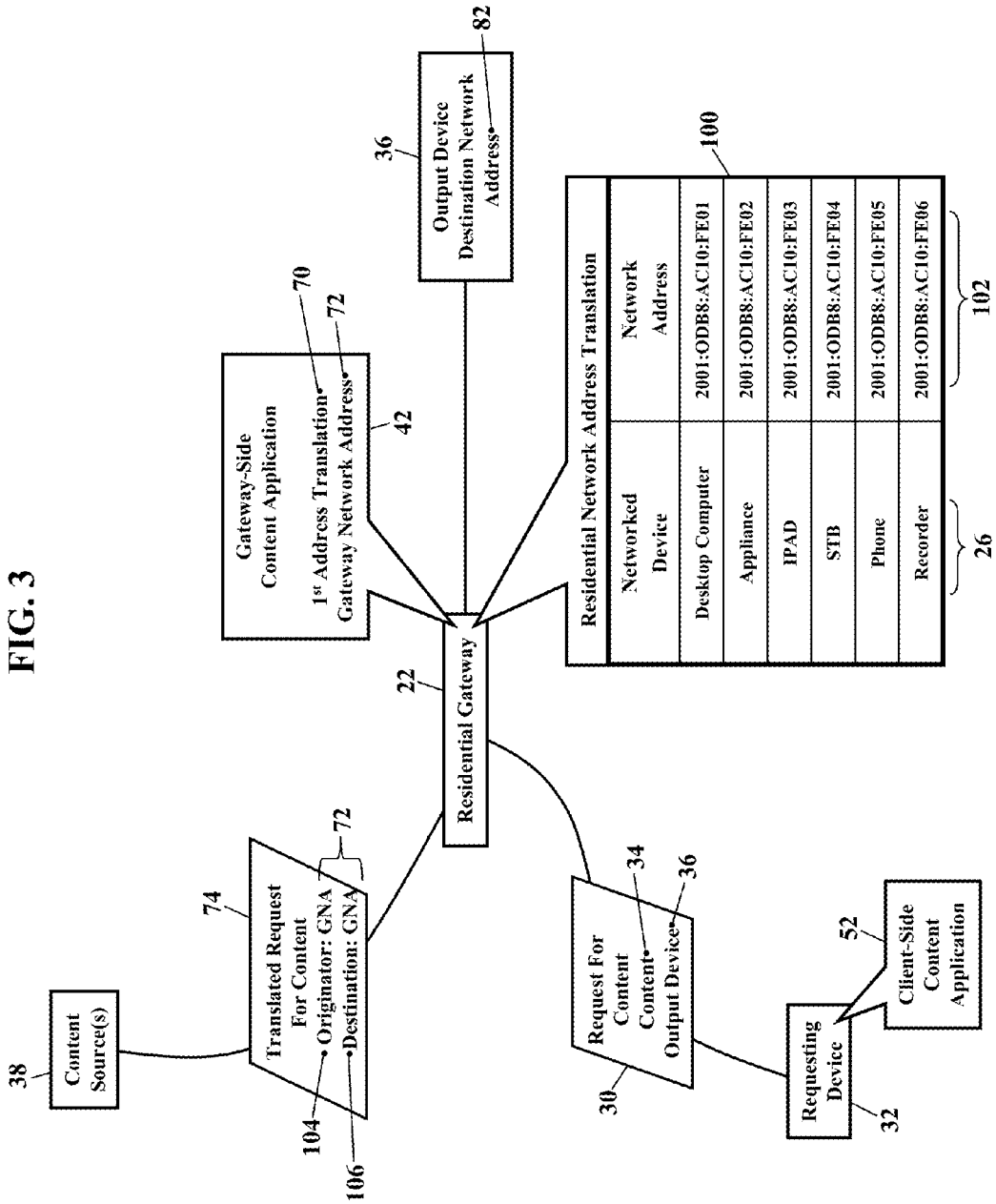
FIGS. 3 and 4 are detailed schematics illustrating an address translation, according to exemplary embodiments.
Figure 4:
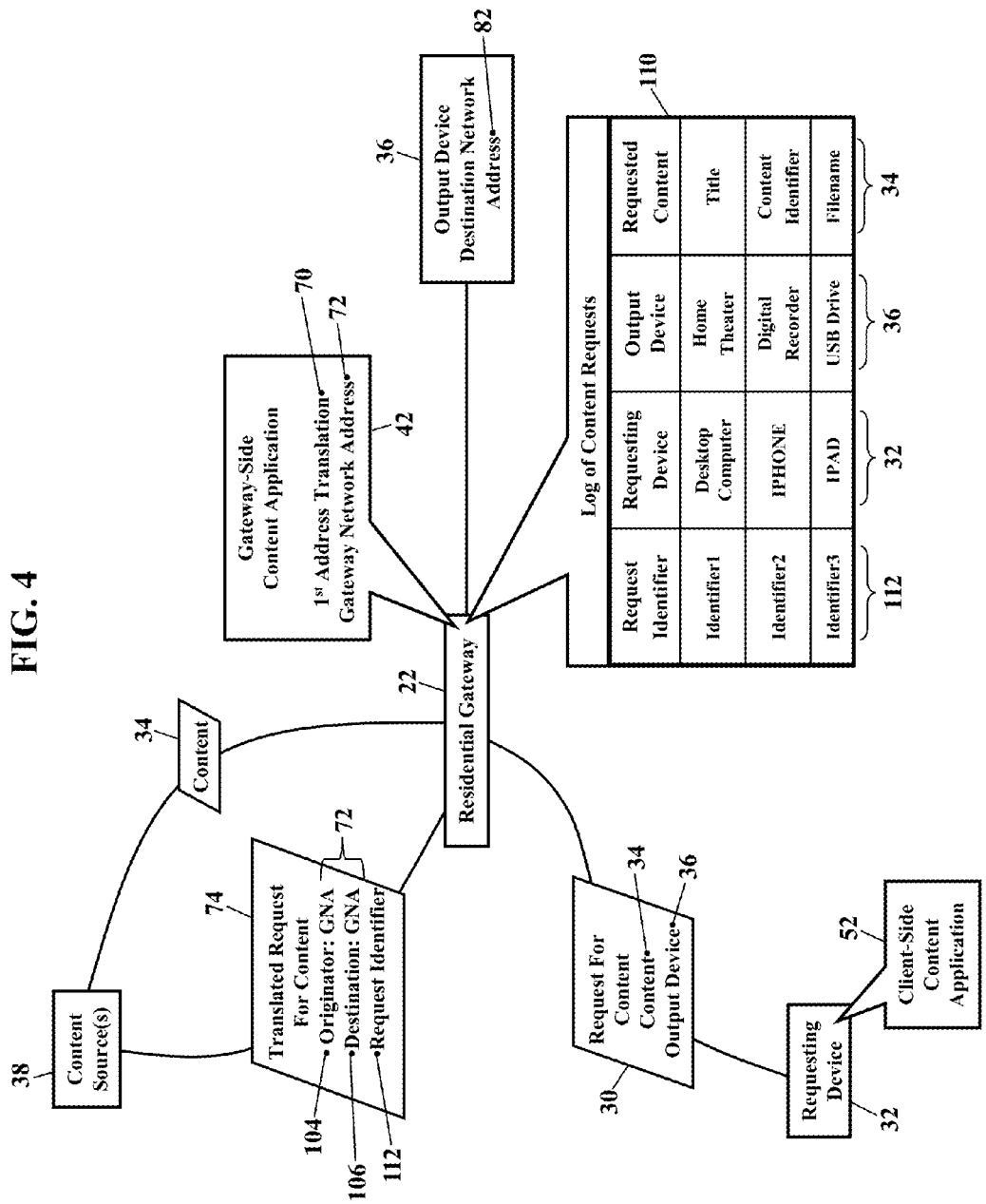

FIGS. 3 and 4 are detailed schematics illustrating the first address translation 70, according to exemplary embodiments. The requesting device 32 sends the request 30 for content to the gateway network address 72 associated with the residential gateway 22. The request 30 for content may include an identification of the requesting device 32. The requesting device 32, for example, may be identified by a device type (e.g., desktop computer, laptop computer, or phone), a network name (e.g., "Mary's IPAD®," "kitchen computer," or "Tom's phone"), and/or an originating network address (e.g., IP address or MAC address) associated with the requesting device 32. The request 30 for content may include an identification of the output device 36. The output device 36, likewise, may be identified by the device type (e.g., USB drive, digital recorder, or set top box), the network name associated with the output device 36 (e.g., "HDTV," "DVR," or "Home Computer"), and/or the destination network address 82 (e.g., IP address or MAC address) associated with the desired output device 36. However the requesting device 32 and the output device 36 are identified, the request 30 for content routes to the gateway network address 72 associated with the residential gateway 22.

The gateway-side content application 42 then performs the first address translation 70. As FIG. 3 illustrates, the gateway-side content application 42 consults a residential network address translation table 100. The residential network address translation table 100 is illustrated as being locally stored in the memory 54 of the residential gateway 22, but the residential network address translation table 100 may be remotely stored, queried, and accessed from any location in the residential network 20 and/or in the data network 24 (illustrated, respectively, as reference numerals 20 and 24 in FIGS. 1 & 2). Regardless, the residential network address translation table 100 may be a user-defined translation that maps, relates, or otherwise associates the user's networked devices 26 to network addresses 102. The residential network address translation table 100 may be dynamically populated as the networked devices 26 are discovered (perhaps using the known Transmission Control Protocol/Internet Protocol (TCP/IP) network protocol). Entries in the residential network address translation table 100 may be removed as any device is disconnected from the residential network 20. The gateway-side content application 42 may query the residential network address translation table 100 to obtain the network address 102 associated with the requesting device 32 and/or the output device 36.

The gateway-side content application 42 generates the translated request 30 for content. Even though the request 30 for content originated from the requesting device 32, the gateway-side content application 42 translates, or spoofs, the request 30 for content to identify the residential gateway 22 as both the requestor and the destination. The gateway-side content application 42 generates the translated request 30 for content to identify the gateway network address ("GNA") 72 as an originating address 104 and as a destination address 106.

FIG. 4 illustrates a log 110 of content requests. The gateway-side content application 42 may also log the translated request 30 for content. Because many requests for content may be received each day, the gateway-side content application 42 may maintain the log 110 of content requests. The log 110 of content requests is illustrated as being locally stored in the memory 54 of the residential gateway 22, but the log 110 of content requests may be remotely stored, queried, and accessed from any location in the residential network 20 and/or in the data network 24. Regardless, the log 110 of content requests tracks the requesting device 32 and the desired output device 36 for each request 30 for content. The gateway-side content application 42 may assign a request identifier 112 to each request 30 for content. Each request identifier 112 may be any alphanumeric combination that uniquely identifies or differentiates the request 30 for content from other requests for content. FIG. 4 illustrates the log 110 of content as a table that maps, relates, or otherwise associates the request identifier 112 of each request 30 for content to the requesting device 32, to the desired output device 36, and to the requested content 34. The log 110 of content thus allows the gateway-side content application 42 to track what content 34 is requested for delivery. The log 110 of content may also assign a date and time stamp to the request 30 for content, thus further differentiating each request for content.

The translated request 30 for content is sent to the content source 38. The translated request 30 for content includes information that identifies the gateway network address 72 as the originating address 104 and as the destination address 106. The translated request 30 for content includes the request identifier 112 that differentiates from other requests for content. The translated request 30 for content routes to the source network address associated with the content source 38. The content source 38 may be some computer, server, or other device accessible from the data network 24. The content source 38 retrieves the requested content 34 and sends the content 34 back to the residential gateway 22, as identified in the translated request 30 for content.

Figure 5:
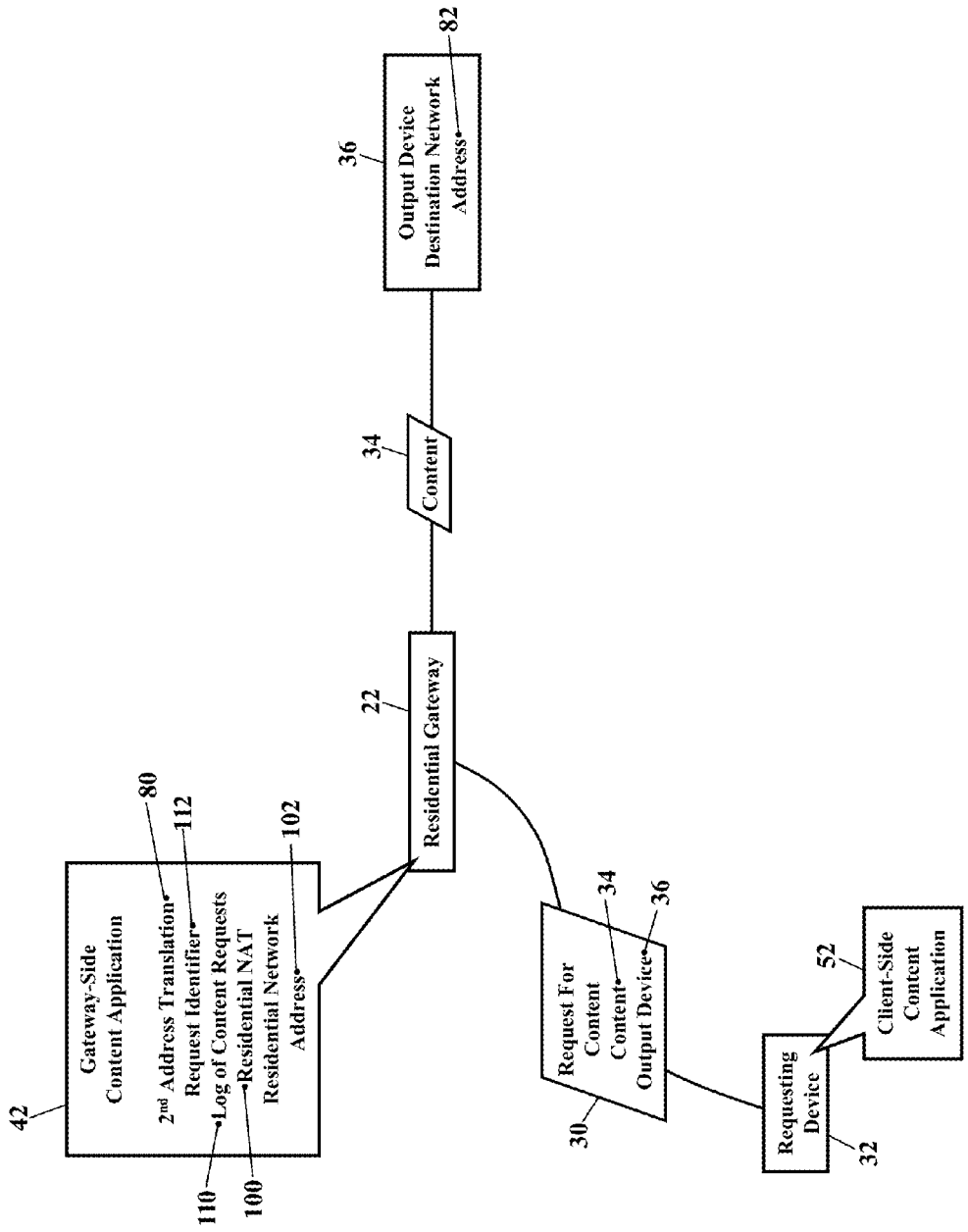
FIG. 5 is a detailed schematic illustrating another address translation, according to exemplary embodiments.

FIG. 5 is a detailed schematic illustrating the second address translation 80, according to exemplary embodiments. When the residential gateway 22 receives the content 34, one or more packets of data (e.g., headers and/or payload) may also include the request identifier 112 that differentiates from other requests for content. As the gateway-side content application 42 receives the content 34, the gateway-side content application 42 also receives the request identifier 112. The gateway-side content application 42 again consults the log 110 of content requests to determine the desired output device 36 associated with the request identifier 112 (as FIG. 4 illustrated). The gateway-side content application 42 queries the log 110 of content requests for the request identifier 112 and retrieves the desired output device 36.

The gateway-side content application 42 then consults the residential network address translation ("NAT") table 100. Now that the original requesting device 32 and the desired output device 36 are known, the gateway-side content application 42 queries the residential network address translation table 100 for the output device 36. Because the residential network address translation table 100 maps the residential network addresses 102 to the networked devices 26, the gateway-side content application 42 retrieves the residential network address 102 associated with the desired output device 36. The residential network address translation ("NAT") table 100 may thus override a conventional DNAT (Dynamic NAT), NAPT (Network Address Port Translation), and SNAT (Static Network Address translation) performed by conventional gateways. The residential network address translation table 100 may logically override, overlay, or ride above these conventional translations. The residential network address translation table 100 may be based on custom-defined algorithms for translations that describe the user's preference for the desired output device 36. The gateway-side content application 42 causes the processor 40 to perform the second address translation 80 by forwarding the requested content 34 to the residential network address 102 associated with the desired output device 36, as originally specified in the request 30 for content. The gateway-side content application 42 thus uses the residential network address 102 associated with the desired output device 36 as the destination network address 82.

Exemplary embodiments thus permit content requests independent of input devices. The residential gateway 22 deliberately inserts itself into transactional requests for media content. Movies, music, and other bandwidth-intensive content may be requested without regard for the capabilities of the requesting device 32. Simple, user-friendly input devices may request bandwidth-intensive, processor-intensive data. Exemplary embodiments thus empower mobile devices to request bandwidth-intensive data without requiring a high-bandwidth connection.

Figure 6:
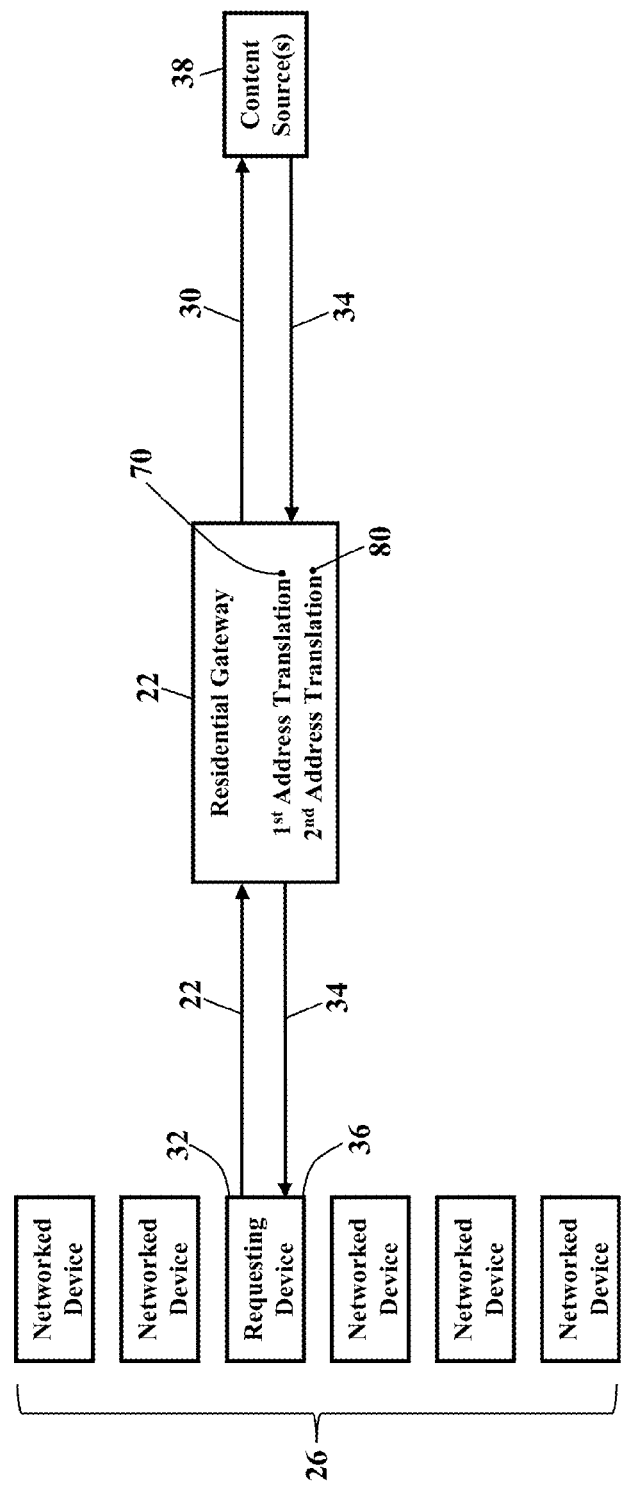
FIGS. 6-8 are flow diagrams illustrating distribution of content, according to exemplary embodiments.
Figure 7:
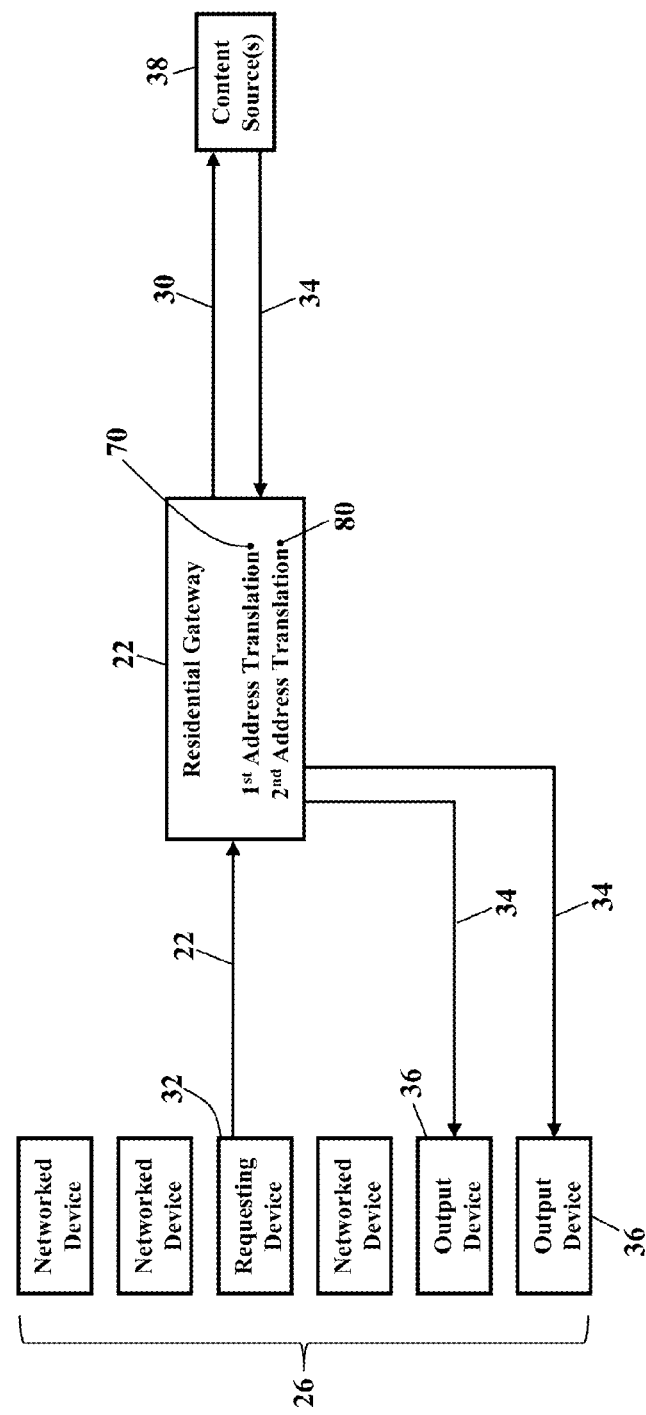
Figure 8:
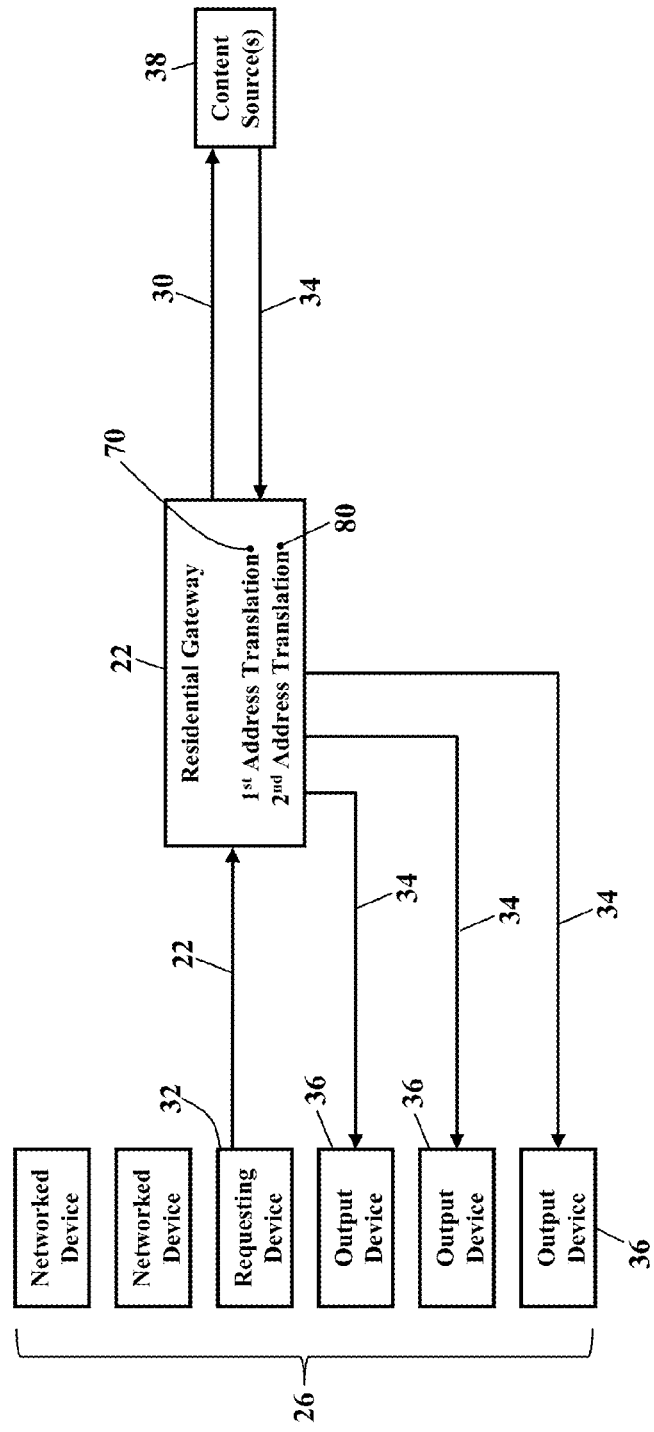

FIGS. 6-8 are flow diagrams further illustrating distribution of content, according to exemplary embodiments. FIG. 6 illustrates an exemplary flow where the requesting device 32 is also the desired output device 36. The requesting device 32 sends the request 30 for content to the residential gateway 22. The gateway-side content application 42 performs the first address translation 70 and sends the translated request 30 for content to the content source 38. The residential gateway 22 receives the requested content 34 from the content source 38. The gateway-side content application 42 performs the second address translation 80 and sends the requested content 34 to the output device 36.

FIGS. 7-8 illustrate shared distribution of the requested content 34, according to exemplary embodiments. The requesting device 32 sends the request 30 for content to the residential gateway 22. Here, though, the user has specified multiple output devices that receive or share the requested content 34. The gateway-side content application 42 performs the first address translation 70, and the translated request 30 for content is sent to the content source 38. The residential gateway 22 then receives the requested content 34. Here, though, because the user has requested multiple output devices, the gateway-side content application 42 performs the second address translation 80 to identify the multiple desired output devices. The residential gateway 22 thus sends the requested content 34 to the multiple output devices.

In FIGS. 6-8, the distribution of the inbound content 34 to the desired output devices 36 may be controlled on an ad-hoc basis by using a TCP/UDP port field in the residential network address translation table 100 of the residential gateway 22. The requested content 34 may also be managed using the multi-cast feature of the IP layer within residential network 20. The residential gateway 22 may manage all the IP-based networked devices 26 and manage broadcasting and multicasting sessions and user authentications on each of devices in the within residential network 20. Each of the networked devices 26 (e.g., IP address or MAC address) and their relationships with IP assignments in the residential network 20 may be accomplished via a multicast management solution based on preference selections. Exemplary embodiments thus may not affect transactions between the residential gateway 22 and the data network 24. All session, device, user, and authentication of the networked devices 26 may be controlled in the residential gateway 22.

Figure 9:
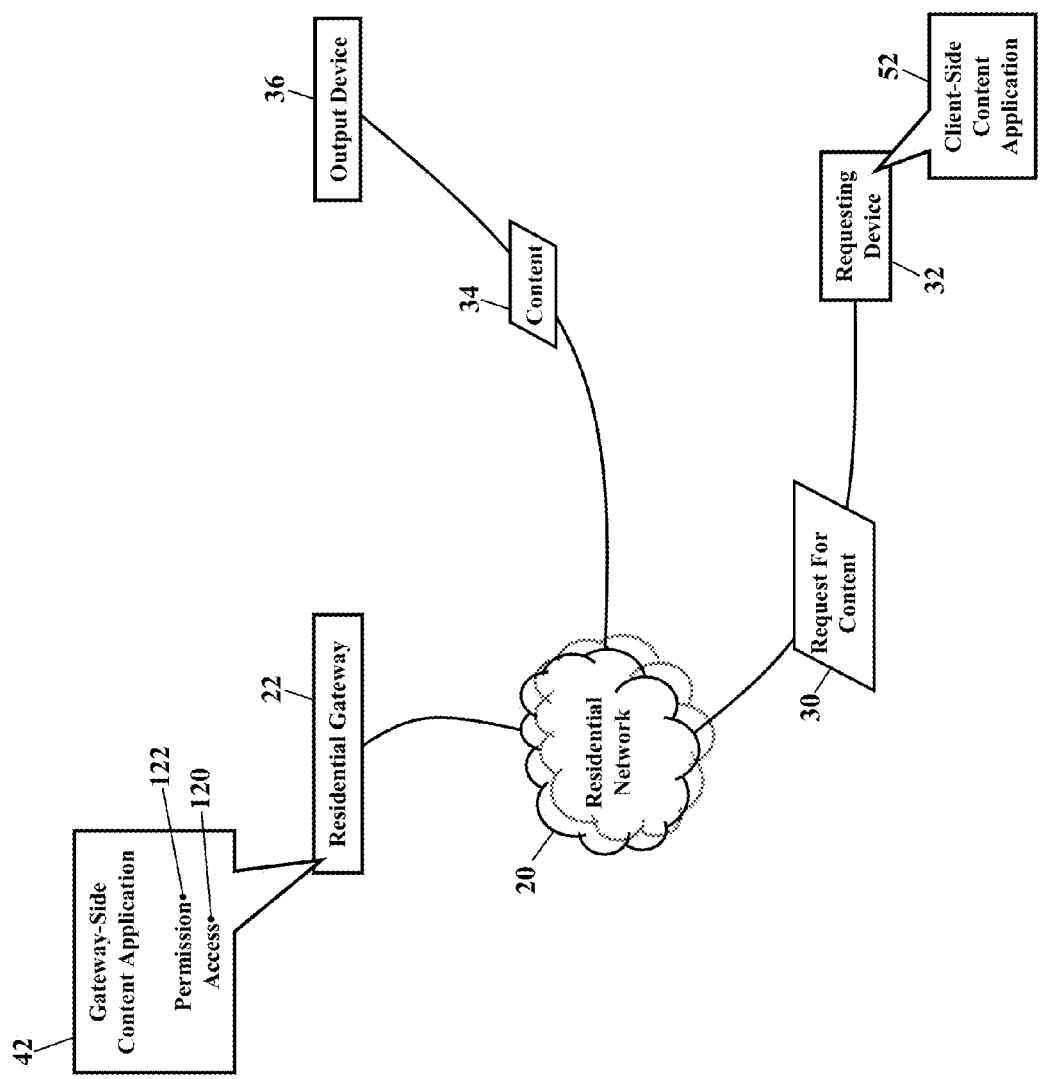
FIG. 9 is a detailed schematic illustrating permissions and access, according to exemplary embodiments.

FIG. 9 is a detailed schematic illustrating permissions and access, according to exemplary embodiments. Here the user may be required to have various credentials before selecting the desired output device 36. If the user wishes to send the requested content 34 to the output device 36, the gateway-side content application 42 may require that the user have permission 120 to direct the content 34 to the desired output device 36. Likewise, the gateway-side content application 42 may additionally or alternatively require that the user have access 122 to the desired output device 36. The gateway-side content application 42 may manage all the IP networked devices 26 in the residential network 20 to include the IP assignment, machine, and user IDs and their relationships to share permission based on the authentication and session. For example, if User ID #1 on device #1 wants output on device #2, then User ID #1 needs permission and access on device #2. With the session permission this information will be consumed by the gateway-side content application 42 and will be applied when the residential gateway 22 is distributing the content 34 in the residential network 20.

Figure 10:
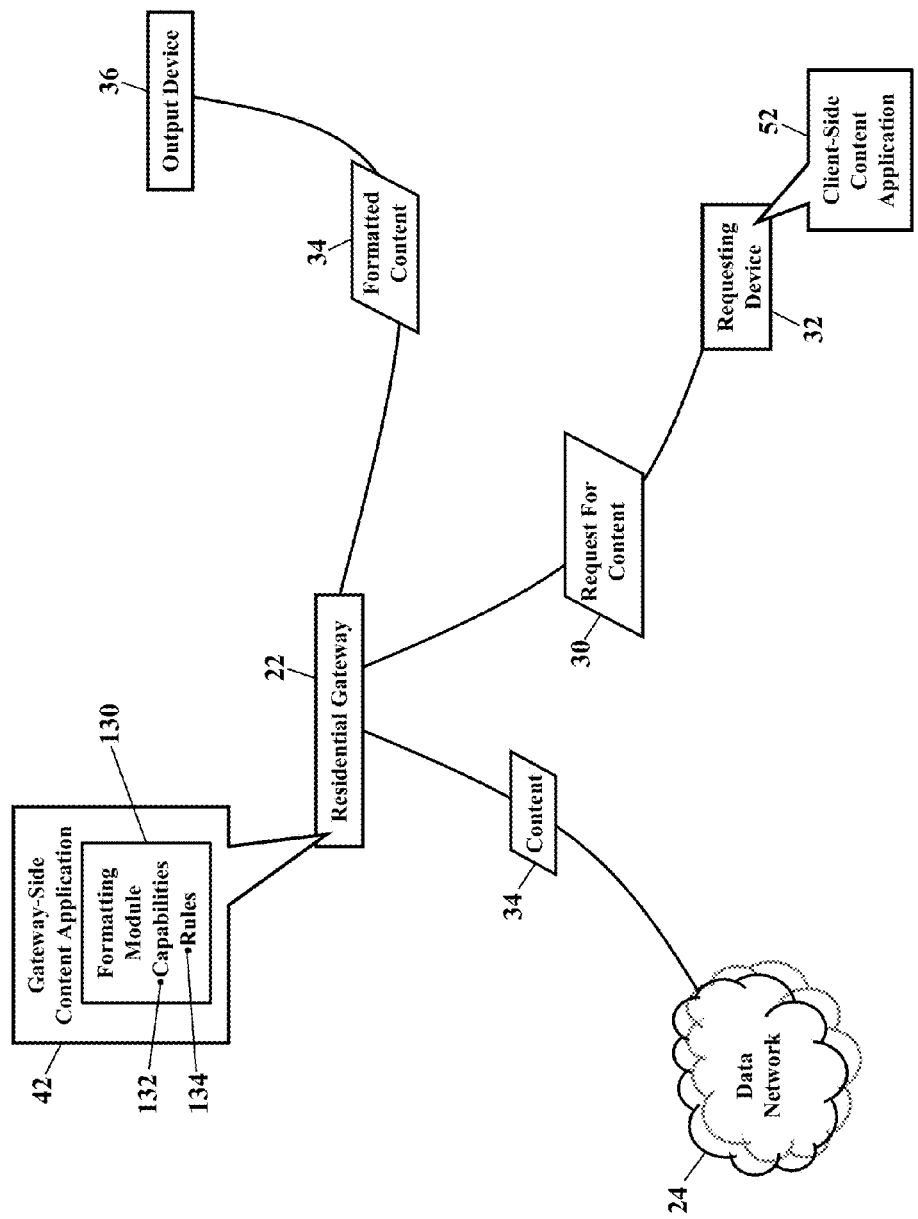
FIG. 10 is a schematic illustrating format conversions, according to exemplary embodiments.

FIG. 10 is a schematic illustrating format conversions, according to exemplary embodiments. Because the capabilities of the requesting device 32 are unimportant, the residential gateway 22 may format the requested content 34 to suit the capabilities of the desired output device 36. That is, once the desired output device 36 is specified by the original request 30 for content, the gateway-side content application 42 may format the requested content 34 to the display, processor, memory, and other capabilities of the desired output device 36. As FIG. 10 illustrates, the gateway-side content application 42 may invoke a formatting module 130. The formatting module 130 accesses the capabilities 132 associated with the desired output device 36. The formatting module 130 may then access formatting rules 134 to convert the content 34 to suit the capabilities of the desired output device 36. The requested content 34, for example, may be recolored, scaled, and even reduced in resolution to suit the processing and display capabilities of the desired output device 36. Formatted content 136 is then routed to the desired output device 36, as originally specified in the request 30 for content.

Figure 11:
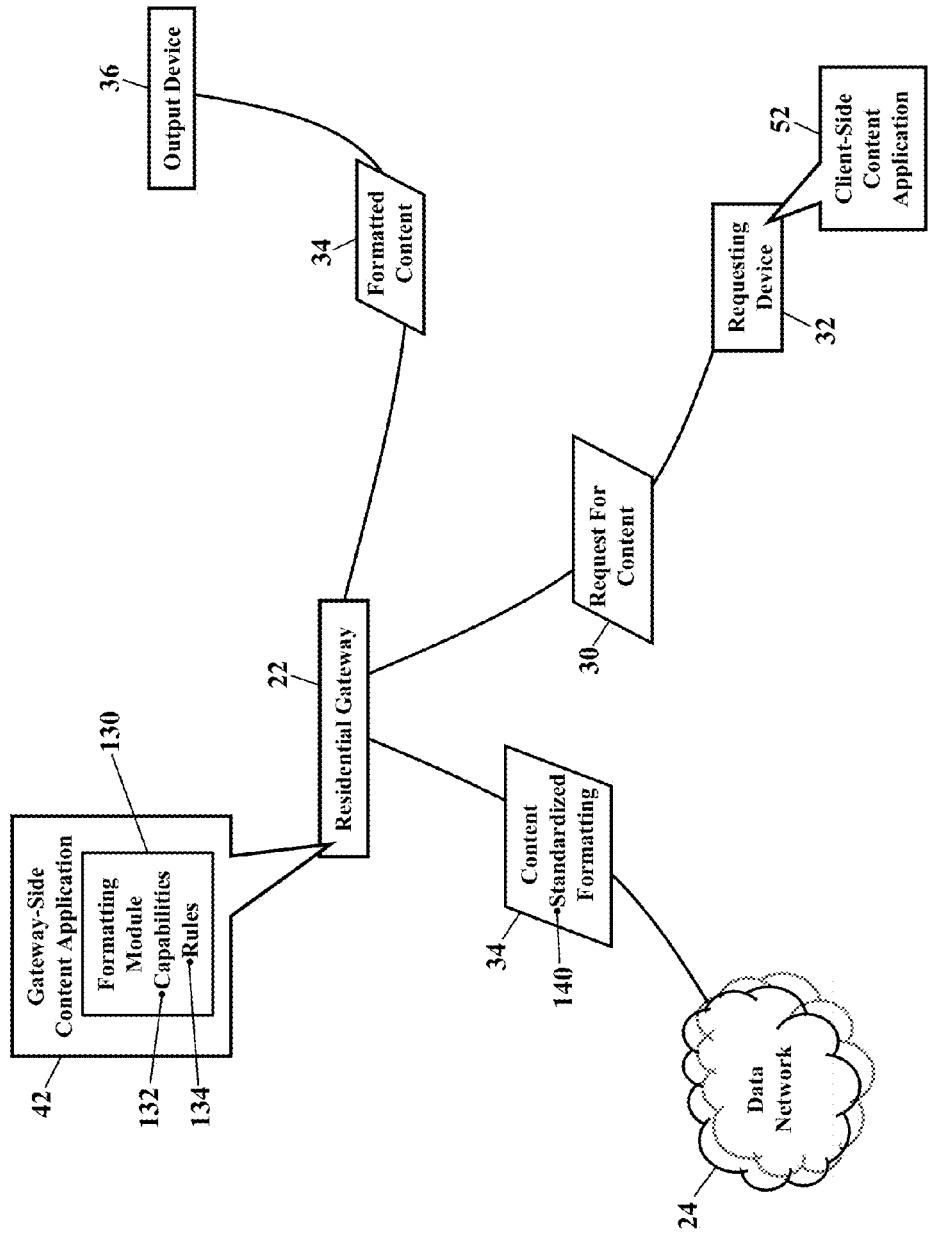
FIG. 11 is a schematic illustrating standard content, according to exemplary embodiments.

FIG. 11 is a schematic illustrating standard content, according to exemplary embodiments. Because the capabilities of the requesting device 32 are unimportant, exemplary embodiments make standardized content a reality. That is, the requested content 34 may have a generic, standardized formatting 140 that is device neutral. FIG. 11, then, illustrates the residential gateway 22 receiving the requested content 34 from the data network 24. Because the requested content 34 has the standardized formatting 140, the gateway-side content application 42 may add formatting to the content 34. The gateway-side content application 42 may invoke the formatting module 130 to format the content 34 to suit the capabilities 132 of the desired output device 36. The formatting module 130 may retrieve and use the formatting rules 134 to convert the standardized formatting 140 into a format more suited to the desired output device 36. The formatted content 136 is then routed to the desired output device 36, as originally specified in the request 30 for content.

Figure 12:
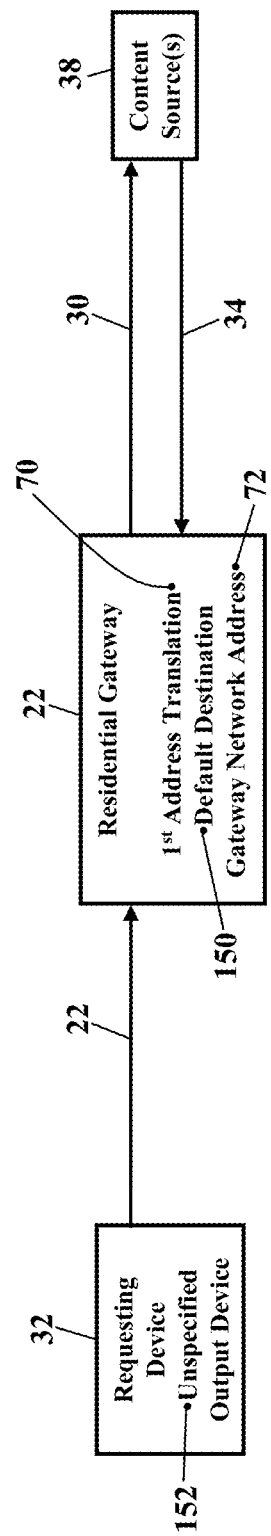
FIG. 12 is a schematic illustrating a default destination, according to exemplary embodiments.

FIG. 12 is a schematic illustrating a default destination 150, according to exemplary embodiments. Sometimes the user may wish to download the content 34, but no make a selection of the desired output device 36. The gateway-side content application 42, in other words, permits an unspecified output device 152. If the request 30 for content does not specify the output device 36, then the gateway-side content application 42 may default to the gateway network address 72 associated with the residential gateway 22. The content 34 will thus be delivered to the residential gateway 22, as before, but the second address translation (illustrated as reference numeral 80 in FIGS. 2 & 5-8) need not be immediately performed. The gateway-side content application 42, instead, may simply store the requested content 34 in the memory 44 of the residential gateway 22 (or some other memory location). Later the user may retrieve the requested content 34 and specify the desired output device 36.

Figure 13:
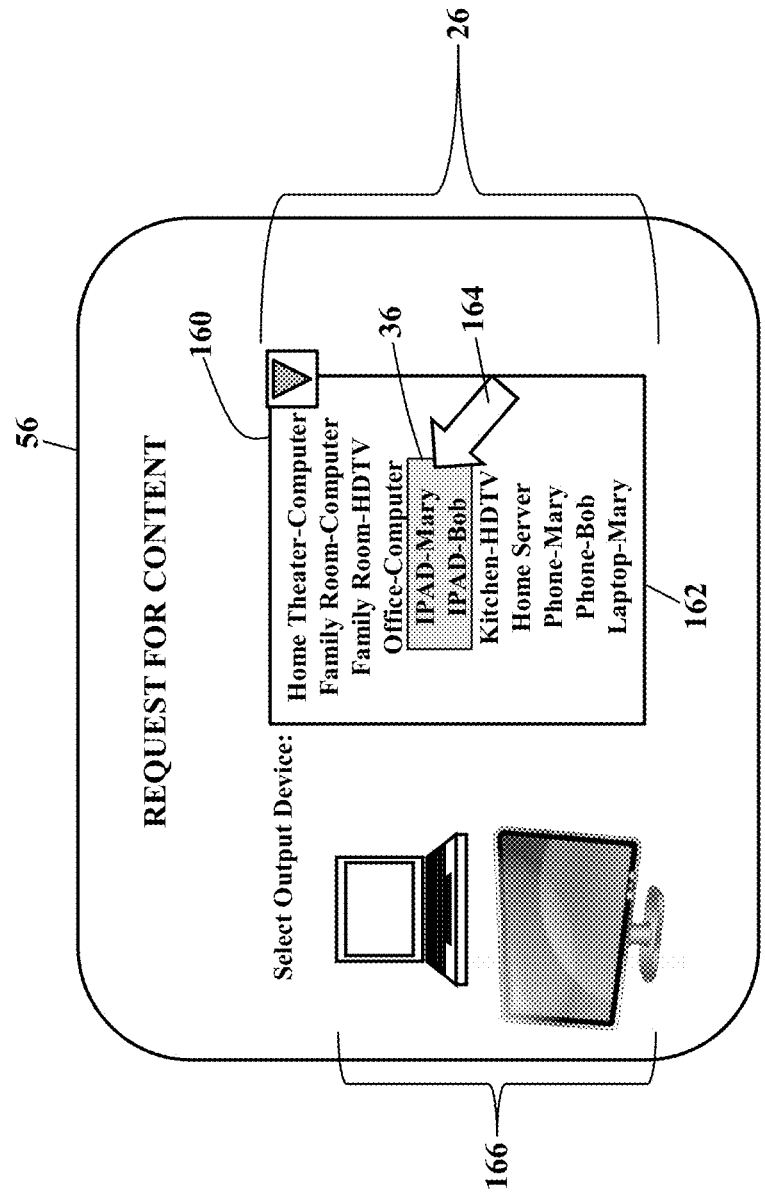
FIG. 13 is a schematic illustrating a graphical user interface, according to exemplary embodiments.

FIG. 13 is a schematic illustrating the graphical user interface 56, according to exemplary embodiments. As earlier paragraphs explained, the graphical user interface 56 may be visually produced on the display device (illustrated as reference numeral 58 in FIG. 2). The graphical user interface 56 allows the user to select the desired output device(s) 36 for the requested content 34. As FIG. 13 illustrates, the graphical user interface 56 presents a listing 160 of the networked devices 26 available to the residential network (illustrated as reference numeral 20 in FIGS. 1 & 2). While any presentation is suitable, FIG. 13 illustrates the listing 160 of the network devices 26 as a drop-down menu 162. The user selects the desired output device(s) 36 from the drop-down menu 162. The user, for example, maneuvers a cursor 164 and makes a selection using a tactile input device, such as a mouse or keyboard. The graphical user interface 56 may alternatively present an icon 166 for each networked device 26. The user selects the icon 166 that corresponds to the desired output device 36.

Exemplary embodiments may be applied regardless of networking environment. The residential network 20 may be a cable network operating in the radio-frequency domain and/or the Internet Protocol (IP) domain. The residential network 20, however, may also include an intranet, a local-area network (LAN), and/or a wide-area network (WAN). The residential network 20 may include coaxial cables, copper wires, fiber optic lines, and/or hybrid-coaxial lines. The residential network 20 may even include wireless portions utilizing any portion of the electromagnetic spectrum and any signaling standard (such as the I.E.E.E. 802 family of standards, GSM/CDMA/TDMA or any cellular standard, and/or the ISM band). The residential network 20 may even include powerline portions, in which signals are communicated via electrical wiring. The concepts described herein may be applied to any wireless/wireline communications network, regardless of physical componentry, physical configuration, or communications standard(s).

The data network 24, likewise, may be applied regardless of networking environment. The data network 24 may be a cable network operating in the radio-frequency domain and/or the Internet Protocol (IP) domain. The data network 24, however, may also include a distributed computing network (such as the Internet), an intranet, a local-area network (LAN), and/or a wide-area network (WAN). The data network 24 may include coaxial cables, copper wires, fiber optic lines, and/or hybrid-coaxial lines. The data network 24 may even include wireless portions utilizing any portion of the electromagnetic spectrum and any signaling standard (such as the I.E.E.E. 802 family of standards, GSM/CDMA/TDMA or any cellular standard, and/or the ISM band). The data network 24 may even include powerline portions, in which signals are communicated via electrical wiring. The concepts described herein may be applied to any wireless/wireline communications network, regardless of physical componentry, physical configuration, or communications standard(s).

Figure 14:
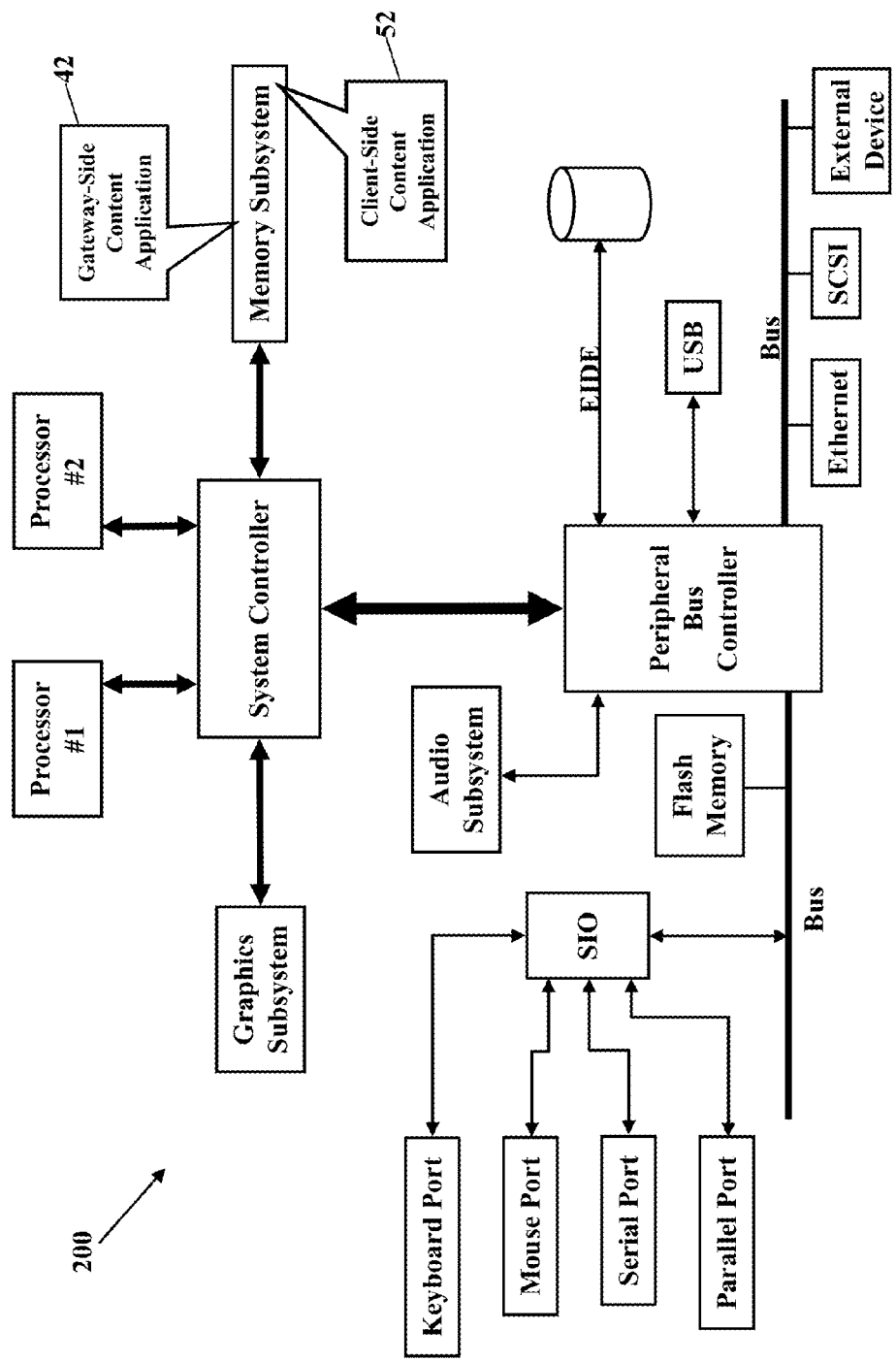
FIGS. 14 and 15 are schematics depicting other possible operating environments for additional aspects of the exemplary embodiments.

FIG. 14 is a schematic illustrating still more exemplary embodiments. FIG. 14 is a generic block diagram illustrating the gateway-side content application 42, and/or the client-side content application 52, operating within a processor-controlled device 200. As this disclosure above explained, the gateway-side content application 42 and/or the client-side content application 52 may operate in any processor-controlled device 200. FIG. 14, then, illustrates the gateway-side content application 42, and/or the client-side content application 52, stored in a memory subsystem of the processor-controlled device 200. One or more processors communicate with the memory subsystem and execute the gateway-side content application 42 and/or the client-side content application 52. Because the processor-controlled device 200 is well-known to those of ordinary skill in the art, no detailed explanation is needed.

Figure 15:
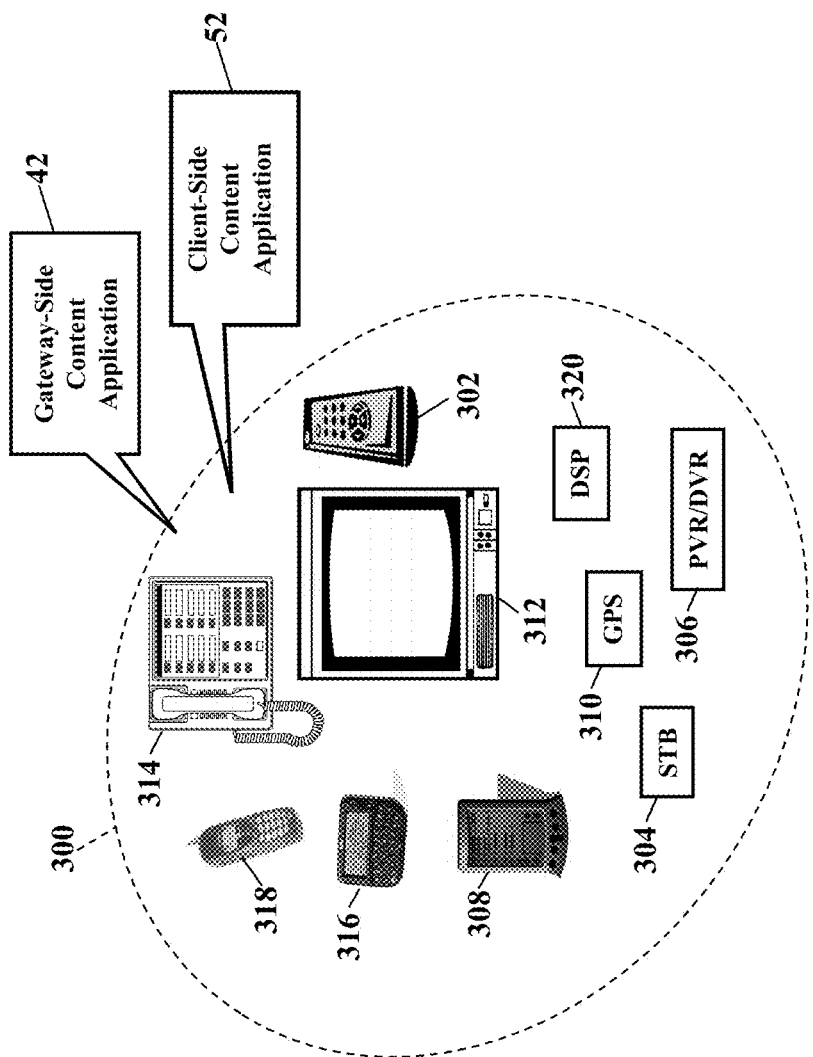

FIG. 15 depicts other possible operating environments for additional aspects of the exemplary embodiments. FIG. 15 illustrates the gateway-side content application 42, and/or the client-side content application 52, operating within various other devices 300. FIG. 15, for example, illustrates that the gateway-side content application 42 and/or the client-side content application 52 may entirely or partially operate within a remote control 302, a set-top box ("STB") 304, a personal/digital video recorder (PVR/DVR) 306, a personal digital assistant (PDA) 308, a Global Positioning System (GPS) device 310, an interactive television 312, an Internet Protocol (IP) phone 314, a pager 316, a cellular/satellite phone 318, or any computer system, communications device, or processor-controlled device utilizing the processor 40 and/or a digital signal processor (DP/DSP) 320. The device 500 may also include watches, radios, vehicle electronics, clocks, printers, gateways, mobile/implantable medical devices, and other apparatuses and systems. Because the architecture and operating principles of the various devices 500 are well known, the hardware and software componentry of the various devices 300 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises a computer readable medium storing processor-executable instructions for managing content, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a gateway, an electronic request for content sent from a requesting device, the electronic request for the content specifying a different output device to which the content is delivered;
   storing, by the gateway, log entries that electronically log the electronic request for the content to a requesting address associated with the requesting device, to a destination address associated with the different output device, and to an identifier associated with the content;
   generating, by the gateway, a translated electronic request for the content, the translated electronic request for the content substituting a gateway network address associated with the gateway as both a requestor and a destination for the content;
   sending, by the gateway, the translated electronic request for the content into a data network;
   receiving, by the gateway, the content;
   querying, by the gateway, the log entries for the identifier associated with the content;
   retrieving, by the gateway, the destination address from the log entries, the destination address electronically logged in association with the identifier associated with the content received by the gateway; and
   forwarding, by the gateway, the content to the destination address associated with the output device that is different from the requesting device.

2. The method of claim 1, further comprising receiving the content addressed to the gateway network address.

3. The method of claim 1, further comprising receiving a selection of the different output device in a graphical listing of output devices.

4. The method of claim 3, further comprising populating the graphical listing with the output devices.

5. A system, comprising:
   a processor operating in a gateway; and
   a memory device, the memory device storing instructions, the instructions when executed causing the processor to perform operations, the operations comprising:
   receiving an electronic request for content sent from a requesting device, the electronic request for the content specifying an output device that is different from the requesting device;
   storing log entries that electronically associate the electronic request for the content to a requesting address associated with the requesting device, to a destination address associated with the output device, and to an identifier associated with the content;
   generating a translated electronic request for the content, the translated electronic request for the content substituting a gateway network address associated with the gateway as both a requestor and a destination for the content;
   sending the translated electronic request for the content from the gateway into a data network;
   receiving the content at the gateway;
   querying the log entries for the identifier associated with the content received at the gateway;
   retrieving the destination address from the log entries, the destination address electronically logged in association with the identifier associated with the content received by the gateway; and
   forwarding the content received by the gateway to the destination address associated with the output device that is different from the requesting device.

6. The system of claim 5, wherein the operations further comprise querying a network address table to retrieve the destination address associated with the output device.

7. The system of claim 5, wherein the operations further comprise receiving the content addressed to the gateway network address.

8. The system of claim 5, wherein the operations further comprise retrieving the destination address associated with the output device.

9. The system of claim 5, wherein the operations further comprise receiving a selection of the output device in a graphical listing of output devices.

10. The system of claim 9, wherein the operations further comprise populating the graphical listing.

11. A memory device storing computer readable instructions that when executed by a processor at a gateway cause the processor to perform operations, the operations comprising:
    receiving an electronic request for content sent from a requesting device, the electronic request for the content specifying a different output device from the requesting device;
    storing an entry in an electronic log, the entry electronically associating the electronic request for the content to a requesting address associated with the requesting device, to a destination address associated with the different output device, and to an identifier associated with the content;
    generating a translated electronic request for the content, the translated electronic request for the content substituting a gateway network address associated with the gateway as both a requestor and a destination for the content;
    sending the translated electronic request for the content from the gateway into a data network;
    receiving the content at the gateway in response to the translated electronic request;
    querying the electronic log for the identifier associated with the content received at the gateway to determine the different output device;
    querying a network address table to determine the destination address associated with the different output device; and
    forwarding the content from the gateway to the different output device associated with the destination address.

12. The memory device of claim 11, wherein the operations further comprise populating the network address table.

13. The memory device of claim 11, wherein the operations further comprise receiving the content addressed to the gateway network address.

14. The memory device of claim 11, wherein the operations further comprise retrieving the destination address.

15. The memory device of claim 11, wherein the operations further comprise sending the content to the destination address.

16. The memory device of claim 15, wherein the operations further comprise receiving a selection of the different output device in a graphical listing of output devices.

* * * * *